United States Patent Office 3,817,882
Patented June 18, 1974

3,817,882
PROCESS FOR PRODUCING URETHANE FOAM IN THE PRESENCE OF A SILOXANE-OXALKYLENE BLOCK COPOLYMER
Fritz Hostettler, Montclair, N.J., and Eugene F. Cox, Charleston, W. Va., assignors to Union Carbide Corporation
No Drawing. Continuation-in-part of applications Ser. No. 686,031, Sept. 25, 1967, now Patent No. 3,392,153, Ser. No. 775,390, Nov. 21, 1958, now Patent No. 3,582,501, Ser. No. 775,691, Nov. 24, 1958, now abandoned, Ser. No. 778,568 and Ser. No. 778,569, both Dec. 8, 1958, both now abandoned, and Ser. No. 402,630, Oct. 8, 1964, now abandoned; application Ser. No. 402,630 being a continuation-in-part of application Ser. No. 116,981, June 14, 1961, now abandoned; said application Ser. No. 116,981 being a continuation-in-part of said application Ser. No. 775,691. This application July 22, 1966, Ser. No. 567,061
Int. Cl. C08g 22/44
U.S. Cl. 260—2.54 H         12 Claims

ABSTRACT OF THE DISCLOSURE

An improvement in the art of urethane foams is described. The improvement resides in the use of a tertiary amine catalyst in combination with a siloxane-oxyalkylene block copolymer surfactant in the production of polyether-based urethane foams.

---

This application is a continuation-in-part of application Ser. Nos. 686,031 filed Sept. 25, 1957, now U.S. 3,392,153; 775,390 filed Nov. 21, 1958; now U.S. 3,582,501; 775,691 filed Nov. 24, 1958, now abandoned; 778,568 filed Dec. 8, 1958, now abandoned; 778,569 filed Dec. 8, 1958, now abandoned; and 402,630 filed Oct. 8, 1964, now abandoned. Ser. No. 402,630 was a continuation-in-part of Ser. No. 116,981, filed June 14, 1961, now abandoned. The said Ser. No. 116,981 was a continuation-in-part of the said Ser. No. 775,691.

The invention relates to the production of urethane polymers which are, generally speaking, the products of the reaction of a polyisocyanate and a compound having an active hydrogen atom. In one aspect, the invention is directed to foamable compositions containing tertiary amine catalysts and siloxaneoxyalkylene block copolymer surfactants. In another aspect, the invention is directed to a process for producing a urethane polymer wherein there is employed a novel organotin-tertiary amine catalyst composition along with the said surfactants.

In recent years foamed resins have become increasingly useful for structural applications, crash pads for automobiles, bed pillows, miladys dainty unmentionables, upholstery, mattresses, cushions, vibration dampening devices, rug backing materials and the like. However, with the advent of foamed resins and their continued wide acceptance, the emphasis naturally shifted to search for the most inexpensive raw materials which would still provide foamed resins embodying the necessary physical characteristics to be suitable for any of the above-mentioned applications. One of the cheapest sources of raw materials for foamed resins are those based on the polyols of the polyether type, hereinafter referred to as polyethers. However, certain physical properties of the polyols based on polyethers (i.e., inherently low viscosities and relatively high surface tensions) are largely responsible for the lack of foam stability. In order to overcome the low viscosity characteristic of the polyether and impart foam stability, it became necessary to pre-react the polyether with an organic polyisocyanate in the absence of water to form a so-called "prepolymer" (i.e., a linear polyether-polyurethane polymer) prior to further reaction with additional polyisocyanate and water in the presence of a catalyst and a surfactant. This procedure has become popularly known as the "prepolymer foaming technique" and is basically a two-step process. The first step comprises heating the polyether together with a substantially equimolar quantity of an organic diisocyanate in the absence of water at a temperature in the range of from 100° C. to 120° C. for several hours to form a linear polymer containing a plurality of urethane linkages. Subsequently, the "prepolymer" is mixed with from two to three additional mols of diisocyanate at a temperature of from 100° C. to 120° C. Water, a catalyst, and a surfactant are then added to produce a foam.

After the mixture has foamed it is necessary to postcure the same by heating for several hours at temperatures in the range of 200° F. to 250° F. in order to provide a foam of optimum physical properties.

As may be readily observed, one of the most serious disadvantages of the "prepolymer technique" is the excessive cost factor which is added as a result of the step of prepolymer formation. It has been observed that the processing charge per pound of prepolymer formulation is approximately seven cents which amounts to about 17.5 cents per cubic foot of polyurethane foam having a density of 2.5 pounds per cubic foot.

In a major aspect, the process of this invention is based on the discovery that stable polyurethane foams can be produced directly when a polyether and organic polyisocyanate are reacted in the presence of a foaming or blowing agent such as water or a vaporizable liquid or both, a tertiary amine catalyst composition hereinafter described, and a surfactant system comprising a polysiloxane-polyoxyalkylene copolymer. The novel process of this invention obviates the "prepolymer" formation step as well as the required high temperature heat curing step of previously known processes and, in addition, provides novel stable foamed resins possessing somewhat higher compressive strength than "prepolymer" foams of comparable composition.

It is an object of this invention to provide a novel series of stable polyether-polyurethane foams which possess superior desirable physical properties. It is a further object of this invention to provide a novel process for the production of the above-mentioned foams. A still further object of this invention is to provide a novel process for the production of stable foams which does not require the employment of the step of "prepolymer" formation.

The process of this invention comprises reacting a polyether, an organic polyisocyanate and a foaming or blowing agent such as water or a vaporizable liquid or both in the presence of a catalyst composition comprising a tertiary amine either alone or combined with an organic tin compound characterized by the presence therein of at least one direct carbon to tin valence bond, and a surfactant comprising a polysiloxane-oxyalkylene copolymer.

As used herein, the term "polyether" is intended to include linear and branched polyethers having at least one and preferably a plurality of ether linkages and containing at least two hydroxyl groups and being substantially free from functional groups other than hydroxyl. Preferred polyethers are the polyoxyalkylene polyols. Among the polyoxyalkylene polyols which are useful in the practice of this invention are the polyethylene glycols having average molecular weights of 200, 400 and 600 and the polypropylene glycols having average molecular weights of 400, 750, 1200 and 2000. Polymers and copolymers of polyoxyalkylene polyols are also adaptable in the process of this invention as well as the block copolymers of ethylene and propylene oxide. Among the copolymers of polyoxyalkylene polyols, and particularly propylene oxide, that deserve some special mention are the propyleneoxide adducts of ethylene glycol, glycerol, 1,2,6-hexanetriol, trimethylolpropane, trimethylolethane, pentaerythritol, tris(hydroxyphenyl)propanes, triethanolamine, triisopropanolamine, ethylenediamine, diethylenetriamine and ethanolamine more fully described hereinafter. Linear and branched copolyethers of ethylene oxide and propylene oxide have also been found to be useful in making the foamed products of this invention. Preferred copolymers of propylene oxide and ethylene oxide containing 10 percent ethylene oxide in molecular weights of 500, 2000, 3000, and 4000.

It is to be understood that the term "substantially free of functional groups other than hydroxyl" does not exclude the presence of other functional groups such as amino or carboxyl except when the essential character of the starting material as a polyether is destroyed. As hereinafter disclosed it is sometimes desirable to employ branched chain polyethers as starting materials in the process of the invention and as disclosed polyfunctional initiators containing functional groups of the type aforesaid are useful for such purposes. To this extent then the polyether starting materials are substantially free from functional groups other than hydroxyl.

Further useful types of polyethers in the process of this invention are block copolymers prepared from propylene oxide and ethylene oxide. These polyethers can be characterized by reference to the following general formulae:

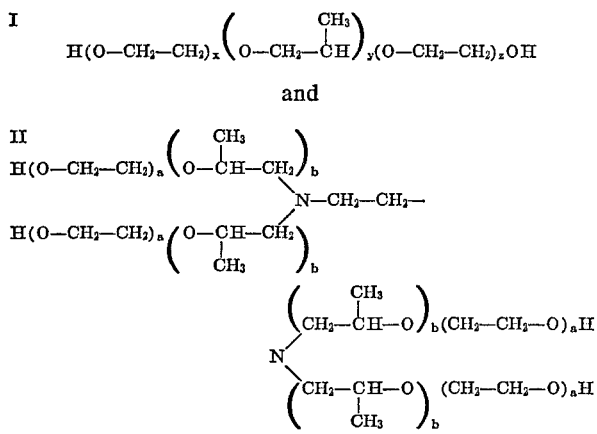

wherein Formula I subscripts, $x$, $y$ and $z$, represent positive integers in the range of from 2 to 100 and the subscripts $a$ and $b$ of Formula II represent positive integer in the range of from 1 to 200.

Polyethers having a highly branched chain network are also useful in the process of this invention. Such highly branched chain polyethers are readily prepared from alkylene oxides of the type above described and initiators having a functionality greater than two. Highly branched polyethers have the advantage of making possible cross linking without the interaction of urea or urethane groups. This has the advantage of making a larger proportion of the isocyanate used available for the evolution of carbon dioxide and the reducing of the overall amount of isocyanate that is required in the preparation of the foamed polymer.

The higher functional initiators that are useful with the alkylene oxides, described above, include polyols, polyamines and amino alcohols having a total of three or more reactive hydrogen atoms on hydroxyl and primary or secondary amino groups. Suitable polyols include triols such as glycerol, 1,1,1-trimethylolpropane, butanetriols, hexanetriols, trimethylolphenol, tris-(hydroxyphenyl)propanes, trialkanolamines, various tetrols such as erythritol and pentaerythritol; pentols; hexols such as dipentaerythritol and sorbitol, as well as carbohydrates, polyhydroxy fatty acid esters such as castor oil and polyoxyalkylated derivatives or polyfunctional compounds having three or more reactive hydrogen atoms such as, for example, the reaction product of 1,1,1-trimethylolpropane, glycerol and other polyols with ethylene oxide, propylene oxide or other epoxides or copolymers thereof, e.g., copolymers of ethylene and propylene oxides. Higher functional amino alcohols and polyamines include, by way of example, diethanolamine, diisopropanolamine, 2-(2-amino-ethylamino)ethanol, 2-amino - 2 - (hydroxymethyl)-1,3-propanediol, diethylenetriamine, triethylenetetramine, as well as various aryl polyamines such as 4,4',4''-methylidynetrianiline and 4,4'-diaminodiphenylmethane.

Another means of increasing the degree of branching, if desired, when employing linear polyethers in the process of this invention is to include a highly functional initiator, as described above, in the mixture charged to the reaction.

Preferred polyethers of the branched type are those prepared by adding propylene oxide to various diols, triols, tetrols, and higher polyols as starters to produce adducts of various molecular weights. Polyethers which deserve special mention are the 1,2,6-hexanetriol adducts of propylene oxide having molecular weights of 500, 700, 1500, 2500, 3000 and 4000.

The amount of highly functional initiator normally employed with the linear type polyethers described above is an amount in the range of from 0.5 to 6.0% by weight of said initiator based on the weight of polyether charged to the reaction.

In producing the polyether polyols by the reaction of alkylene oxide with an active hydrogen-containing starter as described above, a proportion (for instance, up to 50 weight percent or more) of the alkylene oxide can be replaced with a lactone, preferably an epsilon-caprolactone. The resulting polyesterethers are highly desirable for use in the invention.

The polyethers suitable for employment in the process of this invention can be conveniently characterized as normally, liquid, pourable polyethers having viscosities in the range of from 50 centipoises to about 40–50,000 centipoises and having preferably molecular weights in the range of from about 200 to about 10,000. When employing polyethers having molecular weights in the range above described, it is readily apparent that foams can be prepared which are tailor-made to the requirements of specific applications. For example, where maximum flexibility of the foamed polymer is a primary requirement, the polyether should, for optimum results, have a molecular weight of approximately 3,000–7,000 if it is a branched type polyether and somewhat less, about 1700–3,000, if it is a substantially linear type polyether. While it has not been definitely established for semi-rigid foams, the molecular weight of branched polyethers should be in the range of from 1,000 to about 1,500 and of linear polyethers in the range of from 500–1,000. When it is desired to produce a rigid foam, the molecular weight of the starting polyether should be in the range of from 500–1,000 if the polyether is branched; if linear, the molecular weight of the polyether should be somewhat less, that is, about 300–700.

The average molecular weight and reactivity of the polyether can be readily determined by analysis for hydroxyl and carboxyl content. The acid or carboxyl number (mg. of KOH per gram of polyether using phenolphthalein as an indicator) is a measure of the number of terminal carboxyl groups. The hydroxyl number, which is a measure of the number of terminal hydroxyl groups, is defined in terms of mg. of KOH per gram of polyether and is determined by adding pyridine and acetic anhydride to the polyether and titrating the acetic acid formed with KOH. The sum of acid or carboxyl number and the hydroxyl number, referred to as the reactive number, is an indication of the average number of terminal groups present in the polyether and, therefore is, in turn, an indication of the degree of polymerization. Molecular weight can readily be calculated from the hydroxyl and carboxyl numbers by reference to the formula:

$$MW = \frac{\text{Functionality} \times 1000 \times 56.1}{\text{OH No.} + \text{COOH No.}}$$

The polyisocyanates and polyisothiocyanate which find utility in the process of this invention are those corresponding to the general formula:

III $\qquad R(NCX)_n$ wherein $n$ is two or more, R is a divalent or polyvalent organic radical free of functional groups other than —(NCX) and X is an oxygen or sulfur atom. More particularly, R can be alkylene, substituted alkylene, arylene, substituted arylene, a hydrocarbon or substituted hydrocarbon containing one or more aryl—NCY bonds and one or more alkyl—NCY bonds, a hydrocarbon or substituted hydrocarbon containing a plurality of either aryl—NCY or alkyl—NCY bonds. R can also include radicals such as —R—Z—R— where Z may be any divalent moiety such as —O—, —O—R—O, —CO—, —S—, —S—R—S—, —SO$_2$—, etc. Examples of such compounds include hexamethylene diisocyanate, xylylene diisocyanate, (OCNHCH$_2$CH$_2$CH$_2$OCH$_2$)$_2$, 1-methyl-2,4-diisocyanatocyclohexane, phenylene diisocyanates, tolylene diisocyanates e.g., 2,4- and 2,6-tolylene diisocyanates, chlorophenylene diisocyanates, diphenylmethane-4,4'-diisocyanate, naphthalene-1,5-diisocyanate, xylylene diisocyanates, triphenylmethane-4,4',4''-triisocyanate, xylylene-α,α' - diisothiocyanate, isopropylbenzene-α,4-diisocyanate, and many others that are well known in the art.

The organic isocyanates are preferred for the reason that, while the organic isothiocyanates are adaptable in the process of the invention, they will decompose during foaming generating poisonous carbon oxysulfide.

The catalysts employed in the process of the invention, either alone or combined with tin catalysts, are the tertiary amines such as triethylamine, tripropylamine, tributylamine, triamylamine, trioctylamine, dimethylacetylamine, N-methylmorpholine, N-ethylmorpholine, N-octadecylmorpholine, N-methyldiethanolamine, N,N-dimethylethanolamine, N,N' - bis(2 - hydroxyethyl)piperazine, N,N,N',N' - tetramethylethylenediamine, N,N,N',N'-tetramethyl - 1,3 - propanediamine, N,N,N',N'-tetramethyl-1,3-butanediamine, 1,4-bis(2-hydroxypropyl) - 2 - methylpiperazine, N,N - dimethylbenzylamine, N,N-dimethylcyclohexylamine, N,N-diethylcyclohexylamine, benzyltriethylammonium bromide, bis(N,N - diethylaminoethyl)adipate, triethylenediamine, i.e., 1,4 - diazabicyclo[2.2.2]octane, trimethylaminoethylpiperazine, N,N-diethylbenzylamine, N-ethylhexamethyleneamine, N-ethylpiperidine, alpha-methylbenzyldimethylamine, dimethylhexadecylamine, 3 - methylisoquinoline, dimethylcetylamine, pyridine-N-oxide, bis[2 - (N,N-dimethylamino)ethyl] ether, and isocyanates and organic tin compounds containing tertiary amines.

Typical tertiary amine catalysts containing active hydrogen atoms reactive with isocyanate groups include triethanolamine, triisopropanolamine, N-methyldiethanolamine, N-ethyldiethanolamine, polyoxyalkylene polyol polymers and copolymers of alkylene oxides, such as propylene oxide, ethylene oxide, homopolymers, copolymers and mixtures thereof started with triethanolamine, triisopropanolamine, ethylenediamine, ethanolamine, diethylenetriamine and the like.

As hereinbefore set forth, the catalyst compositions which find utility in the process of the invention can also contain an organic tin compound containing a direct carbon to tin bond as well as a tertiary amine. Among the many types of organic tin compounds characterized by the presence therein of a direct carbon to tin bond, of which specific representative compounds have been tested as candidates for the catalyst compositions useful in the methods of this invention and shown to be active, are:

(A) Tin compounds having four carbon to tin bonds and no intensifying bonds such as tetramethyltin, tetraethyltin, tetrapropyltin, tetrabutyltin, tetraoctyltin, tetralauryltin, tetrabenzyltin, tetrakis(2-phenylethyl)tin, tetraphenyltin, tetrapara-tolyltin, tetravinyltin, tetraallyltin, tetrakis(chloromethyl)tin, tetramethylsulfonylmethyltin, tetra-para-methoxyphenyltin, tetra-para-nitrophenyltin, as well as unsymmetrical compounds as exemplified by 2-cyanatoethyltributyltin, dibutyldiphenyltin and various addition products of alkyl, aryl and aralkyltin hydrides with unsaturated organic compounds such as acrylonitrile, allyl cyanide, crotononitrile, acrylamide, methyl acrylate, allyl alcohol, acrolein diethyl acetal, vinyl acetate, styrene, etc.

(B) Tin compounds having $n$ carbon to tin bonds and 4-n intersifying bonds from tin to halogen or hydrogen atoms or hydroxyl groups in which $n$ is an integer from 1 to 3, such as trimethyltin chloride, tributyltin chloride, trioctyltin chloride, triphenyltin chloride, trimethyltin bromide, tributyltin fluoride, triallyltin chloride, tributyltin hydride, triphenyltin hydride, trimethyltin hydroxide, tributyltin hydroxide, dimethyltin dichloride, dibutyltin dichloride, dioctyltin dichloride, bis(2-phenylethyl)tin dichloride, diphenyltin dichloride, divinyltin dichloride, diallyltin dibromide, diallyltin diiodide, dibutyltin difluoride, bis(carboethoxymethyl)tin diiodide, bis(carbomethoxyethyl)tin dichloride, dibutyltin dihydride, butyltin trichloride and octyltin trichloride.

(C) Tin compounds having two carbon to tin bonds and a catalytically intensifying double bond from tin to oxygen or sulfur, such as dimethyltin oxide, diethyltin oxide, dibutyltin oxide, dioctyltin oxide, dilauryltin oxide, diphenyltin oxide, and diallyltin oxide, all prepared by hydrolysis of the corresponding dihalides, as well as bis(2-phenylethyl)tin oxide, [HOOC(CH$_2$)$_5$]SnO, $$[CH_3OCH_2(CH_2OCH_2)_{x-1}CH_2]_2SnO,$$

[CH$_3$OCH$_2$(CH$_2$OCH$_2$)$_{x-1}$CH$_2$O(CH$_2$)$_5$]$_2$SnO and dibutyltin sulfide, the $x$ variables being whole integers.

(D) Tin compounds having $n$ carbon to tin bonds and 4-n intensifying bonds from tin to oxygen, sulfur, nitrogen or phosphorous linking organic radicals, $n$ being an integer in the range of from 1 to 3 inclusive, such as tributyltin methoxide, tributyltin butoxide, tributyltin acetate, tributyltin N-piperazinylthiocarbonylmercaptide, tributyltin phosphorous dibutoxide [prepared as indicated immediately below:

$$2(C_4H_9O)_3P + PCl \rightarrow 3(C_4H_9O)_2PCl$$

$$(C_4H_9)_3SnCl + 2Na \rightarrow (C_4H_9)_3SnNa + NaCl$$

$$(C_4H_9)_3SnNa + (C_4H_9O)_2PCl \xrightarrow{NH_3} (C_4H_9)_3SnP(OC_4H_9)_2 + NaCl],$$

dibutyltin dibutoxide, $$(C_4H_9)_2Sn[OCH_2(CH_2OCH_2)_{x-1}CH_2CH_3]_2,$$

dibutyl bis (O-acetylacetonyl)tin, dibutyltin bis(octyl maleate), dibutyltin bis(thiododecoxide), dibutyltin bis(octyl thioglycolate), dibutyltin bis(N-morpholinylcarbonylmethylmercaptide), dibutyltin dibenzenesulfonamide, dimethyltin diacetate, diethyltin diacetate, dibutyltin diacetate, dioctyltin diacetate, dilauryltin diacetate, dibutyltin dilaurate, dibutyltin maleate, dibutyltin bis(N-piperazinylthiocarbonylmercaptide), dioctyltin bis(N-piperazinylthiocarbonylmercapto), octyltin tris(thiobutoxide), butyltin triacetate, methylstannonic acid, ethylstannonic acid, butylstannonic acid, octylstannonic acid, $$HOOC(CH_2)_5SnOOH,$$

$$(CH_3)_3\overset{+}{N}(CH_2)_5SnOOH,$$

$$CH_3OCH_2(CH_2OCH_2)_{x-1}CH_2SnOOH \text{ and}$$

$$CH_3OCH_2(CH_2OCH_2)_{x-1}CH_2O(CH_2)_5SnOOH$$

in which the $x$ variables are positive integers.

(E) Polystannic compounds having carbon to tin bonds and preferably also intensifying bonds from tin to halogen, hydrogen, oxygen, sulfur, nitrogen or phosporous, such as $HOOSn(CH_2)_xSnOOH$ and $$HOOSnCH_2(CH_2OCH_2)_xCH_2SnOOH,$$

the $x$ variables being positive integers, bis-trimethyltin, bis-triphenyltin, bis(tributyltin)oxide, dibutyltin basic laurate, dibutyltin basic hexoxide and other polymeric organo-tin compounds containing carbon to tin bonds and preferably also intensifying bonds, e.g., those having repeating $$\begin{array}{c} R \\ | \\ -SnO- \\ | \\ R \end{array}$$

groups, dimers and trimers of $(R_2SnY)_n$ and the like in which R may be alkyl, aryl or aralkyl radicals and Y is a chalcogen, as well as many other organo-tin compounds heretofore proposed as heat and light stabilizers for chlorinated polymers and commercially available for this purpose.

We have discovered quite unexpectedly that catalyst compositions comprising organic tin compounds characterized by the presence therein of at least one direct carbon to tin bond and tertiary amines exhibit novel synergism when used in accelerating the reaction between isocyanates or isothiocyanates and compounds having groups containing active hydrogen atoms. As has been pointed out in our copending application Ser. No. 686,031 the reaction rates obtainable employing the tin catalysts alone are up to many thousand times the rates achievable with tertiary amine catalysts. It has been observed that the tertiary amine-organotin catalyst compositions exert a synergistic effect since the reaction rates that are obtainable by their use are of the order of from about two to about seven times the best reaction rate of the tin catalyst when it is employed as the sole catalyst for the reaction.

One of the important reactions in polyurethane chemistry is urethane linkage formation. This reaction is the polymerization reaction between isocyanates and polyethers or polyesters to provide the polyether-polyurethane or polyesterpolyurethane:

$$-NCO + -R-OH \longrightarrow -NH-\overset{O}{\underset{\|}{C}}-OR-$$
(urethane)

The ability of representative compositions comprising an organotin compound having at least one direct carbon to tin bond and tertiary amines to catalyze isocyanate reactions yielding the urethane linkage or structure is vividly demonstrated by reacting phenyl isocyanate and n-butanol under carefully controlled conditions. The tests were carried out in each instance by admixing equimolar amounts of phenyl isocyanate and n-butanol in dioxane as a solvent, adding a different catalyst to each mixture and observing the rate of reaction at 70° C. The reaction, catalysts and relative rates based on mol percentage of catalyst per mol of isocyanate are as indicated immediately below in Table I:

TABLE I.—REACTION OF PHENYL ISOCYANATE WITH 1-BUTANOL IN DIOXANE AT 70° C.

$$C_6H_5NCO + C_4H_9OH \xrightarrow[70°\,C.]{C_4H_8O_2} C_6H_5NHCOOC_4H_9$$

Ca. 0.25 M  0.25 M

| Tin catalyst | Mol percent of tin catalyst | Amine catalyst | Mol percent of amine catalyst | Relative rate |
|---|---|---|---|---|
| Dibutyltin diacetate | 0.0099 | | | 540 |
| Do | 0.00197 | | | 110 |
| Do | 0.00105 | | | 59 |
| Do | 0.0005 | | | <38 |
| Do | 0.000198 | | | 16 |
| | | Triethylamine | 9.1 | 70 |
| | | do | 0.88 | 6.7 |
| Do | 0.00098 | do | 1.00 | 250 |
| Do | 0.00098 | do | 0.096 | 200 |
| Do | 0.00098 | do | 0.0096 | 180 |
| Do | 0.00099 | do | 0.0009 | 120 |
| Do | 0.00051 | do | 1.01 | 43 |
| Do | 0.000199 | do | 10.1 | 110 |
| Dioctyltin oxide | 0.00108 | | | 38 |
| Do | 0.00108 | Triethylamine | 1.05 | 90 |
| Dimethyltin dichloride | 0.00121 | | | 94 |
| Do | 0.00121 | Triethylamine | 0.103 | 380 |
| Dibuty tin dichloride | 0.00091 | | | 47 |
| Do | 0.00091 | Triethylamine | 0.103 | 190 |
| Tetrabutyltin | 1.00 | | | 160 |
| Do | 1.00 | Triethylamine | 1.05 | 310 |
| | | n-Methylmorpholine | 10.1 | 29 |
| Dibutyltin diacetate | 0.00098 | do | 10.1 | 210 |
| | | 1,4-diazabicyclo[2,2,2]octane | 0.95 | 110 |
| Do | 0.00098 | do | 1.03 | 350 |
| Without catalyst | | | | 1.0 |

Another very important reaction in polyurethane chemistry is the formation of the urea linkage by the reaction of isocyanates and water.

$$2-NCO + H_2O \longrightarrow -NH-\overset{O}{\underset{\|}{C}}-NH- + CO_2\uparrow$$
(urea)

The isocyanate residues are linked together by the urea linkages $$(-NH-\overset{O}{\underset{\|}{C}}-NH-)$$

and the carbon dioxide gas formed produces an expanded material. The ability of representative tin amine catalyst compositions to accelerate isocyanate reactions to yield the urea linkage is demonstrated by reacting phenyl isocyanate and water in dioxane at 70° C. The reaction, catalyst and combinations thereof and relative rates based on the mol percentage of catalyst are indicated immediately below in Table II:

TABLE II.—REACTION OF PHENYL ISOCYANATE WITH WATER IN DIOXANE AT 70° C.

$$2C_6H_5NCO + H_2O \xrightarrow[70°\,C.]{C_4H_8O_2} C_6H_5NH\overset{O}{\underset{\|}{C}}NHC_6H_5 + CO_2$$

Ca. 0.25 M  0.125 M

| Tin catalyst | Mol percent of tin catalyst | Amine catalyst | Mol percent of amine catalyst | Relative rate |
|---|---|---|---|---|
| Dibutyltin diacetate | 0.00101 | | | 76 |
| Do | 0.0099 | | | 29 |
| | | Triethylamine | 9.80 | 34 |
| | | | | .0 |
| Do | 0.0098 | do | 0.96 | 06 |
| Without catalyst | | | | 1 |

Still another very important reaction in polyurethane chemistry is the formation of the biuret linkage by the reaction of isocyanates and the urea linkage as illustrated by the reaction of the isocyanates and diphenylurea:

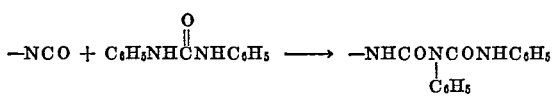

The ability of representative tin-amine catalyst compositions to accelerate isocyanate reaction to yield the biuret linkage is demonstrated by reacting phenyl isocyanate and symmetrical diphenylurea in dioxane at 70° C. The reaction, catalyst and combinations thereof and relative rates based on the mol percentages of catalysts are as indicated immediately below in Table III:

TABLE III.—REACTION OF PHENYL ISOCYANATE WITH SYMMETRICAL DIPHENYLUREA IN DIOXANE AT 70° C.

| Tin catalyst | Mol percent of tin catalyst | Amine catalyst | Mol percent of amine catalyst | Relative rate |
|---|---|---|---|---|
| Dibutyltin diacetate | 0.057 | | | 43 |
| Do | 0.099 | | | 56 |
| Do | 0.166 | | | 76 |
| Do | 0.41 | | | 240 |
| Do | 0.80 | | | 420 |
| | | Triethylamine | 10.0 | 1.9 |
| Do | 0.057 | do | 0.73 | 95 |
| Do | 0.017 | do | 0.73 | 55 |
| Without catalyst | | | | 1.0 |

The foregoing data illustrate the remarkable high catalytic activity of the combinations comprising organic tin compounds characterized by the presence therein of at least one direct carbon to tin bond and tertiary amines. The reactions accelerated were chosen to provide accurate means for comparison of reaction rates under carefully controlled conditions and to serve as a guide to the magnitude of "catalytic amounts" involved without in any sense being considered limitative of the scope of the invention.

The molar concentrations of the ingredients of the tin-amine catalyst compositions can be varied over a wide range since the molar concentrations of the respective ingredients is not necessarily a critical feature of the invention. Molar concentration ratios of tin to amine can be varied from 100:1 to 1:10,000 although molar concentrations above and below the above recommended ratios can be employed if desired.

In preparing the urethane foams in accordance with the practice of this invention, either batchwise or continuously, a polyether, a polyisocyanate or polyisothiocyanate, a foaming or blowing agent such as water or a vaporizable liquid or both, a catalyst of the type described and a siloxane-oxyalkylene surfactant are mixed directly in a suitable container and allowed to react at room temperature. In a matter of minutes, the reaction mixture begins to foam and can be transferred to a mold, if desired. In reacting the ingredients described above, an excess of polyisocyanate or polyisothiocyanate with regard to the polyether and other active hydrogen-containing compounds such as water that may be present is normally employed, for instance, at least about 1.05, and in some cases up to about 1.5 to 6.0, mols of polyisocyanate or polyisothiocyanate per mol of active hydrogen can be employed.

When water is used as the foaming agent, the amount of water employed in the process of this invention should be an amount sufficient to decompose the isocyanate to produce carbon dioxide in situ for forming the voids of the final foamed product. The formation of a good foam depends upon a simultaneous development of carbon dioxide and a cross-linking of the molecules to trap carbon dioxide and thus prevent collapse of the foam. Depending on the desired density of the foam and the amount of cross-linking desired, the amount of water added should be such that the ratio of equivalents of active hydrogen such as hydroxyl groups to equivalents of isocyanate or isothiocyanate (i.e., active H:NCO) is in the range of from 0.5:1.0 to 1.5:1.0 and preferably within the range of from about 0.8:1.0 to 1.2:1.0, and most preferably from 0.85:1.0 to 0.95:1.0. Alternatively other foaming or blowing agents can be readily employed such as a liquified halocarbon, e.g., fluorocarbon or mixtures of liquified fluorocarbons or mixtures of water and liquified fluorocarbons which preferably vaporize at or below the temperature of the foaming reaction product. Fluorocarbons and other halocarbons that find utility include compounds such as trichloromonofluoromethane; methylene dichloride, dichlorodifluoromethane, dichlorofluoromethane, 1,1-dichloro-1-fluoroethane; 1-chloro-1,1-difluoro, 2,2-dichloroethane; and 1,1,1-trifluoro, 2-chloro-2-fluoro, 3,3-difluoro, 4,4,4-trifluorobutane. The amount of blowing or foaming agent used will vary with density desired in the foaming product. In general it may be stated that for 100 grams of resin mix containing an average NCO/OH ratio of about 1 to 1, about 0.005 to 0.3 moles of gas are used to provide densities ranging from 30 to 1 lbs. per cubic foot. If desired, water may be used in conjunction with the halocarbon.

In one major aspect, the process of this invention is based on the discovery that stable polyether-polyurethane reaction products can be produced directly, without the intermediate poduction of a "prepolymer" by the reaction of a polyether, a polyisocyanate, a tertiary amine catalyst composition and a foaming or blowing agent such as water or vaporizable liquid or both, said reaction being carried out in the presence of a surfactant composition comprising a siloxane-oxyalkylene copolymer.

It has been found that the aforementioned surfactants not only permit the utilization of one-step process for the manufacture of stable polyurethane foams based on polyethers but also permit control of foam cell size and structure. Additionally, the surfactant compositions are water soluble thus providing a convenient means for introducing the surfactant compositions to the polyether-polyisocyanate reaction mixture.

The surfactant compositions that have met with considerable success when employed in polyether-polyisocyanate reaction mixtures are the siloxane-oxyalkylene copolymers as stated above. Those which are effective are the linear (block) copolymers of polymeric alkylene oxides and polymeric dialkylsiloxanes; branched (graft) copolymers of polymeric alkylene oxides and polymeric dialkylsiloxanes and copolymers of a dialkylsiloxane and an alkylene oxide.

The siloxane-oxyalkylene copolymer surfactant compositions which have been found to exert such a profound effect are those copolymers which contain from about 10 to about 80 percent by weight of siloxane polymer and from 90 to 20 percent by weight of alkylene oxide polymer.

For the most part, the siloxane-oxyalkylene copolymer surfactant systems comprise predominantly dihydrocarbyl polysiloxane units and oxyalkylene units and may contain one or more, and preferably not more than two or three mono-hydrocarbyl siloxane units (i.e., not more than two or three bifunctional silicon atoms). Normally, the siloxane units are present in combinations of one or more units forming a chain which comprises the polysiloxane block or blocks of the copolymer.

Thus, one type of block copolymer surfactant can be represented by the following general formula:

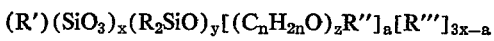

where $x$ is an integer and represents the number of trifunctional silicon atoms bonded to a single monovalent or multivalent hydrocarbyl radical, R′, such as methyl, ethyl, phenyl, etc., $a$ is an integer and represents the number of polyoxyalkylene chains in the block copolymer; $y$ is an integer preferably having a value of at least 3 and denotes the number of difunctional siloxane units, $n$ is an integer in the range of from 2 to 4 inclusive denoting the number of carbon atoms in the oxyalkylene group; and $z$ is an integer preferably having a value of at least 5 and denotes the length of the oxyalkylene chain. It will be understood further that the surfactant compositions are mixtures of such block copolymers wherein $y$ and $z$ are of different values and that methods of determining the chain length of the polysiloxane chains and the polyoxyalkylene chains give values which represent average chain lengths. In the above formula, R and R'' represent monovalent hydrocarbyl radicals, such as alkyl, aryl or aralkyl radicals, e.g., methyl, ethyl, phenyl, tolyl, butyl, benzyl, and the like, and R'' terminates a polyoxyalkylene chain with a monoether group, R''' is an alkyl radical or a trihydrocarbylsilyl radical and may terminate a siloxane chain, and R' repesents a monovalent or polyvalent hydrocarbyl radical, being monovalent when $x$ is 1, divalent when $x$ is 2, trivalent when $x$ is 3, tetravalent when $x$ is 4.

With reference to Formula IV above, there is at least one oxyalkylene chain joined to a siloxane chain through a Si—O—C bond, and when $a=1$ and $x=1$, there are two alkyl or trihydrocarbylsilyl groups R''' terminating siloxane chains. However, when $a=3$ and $x=1$, there are no such groups present.

One type of block copolymer is represented when $x$ in Formula IV is one, and in this instance, a branched-chain formula may be postulated as follows:

V

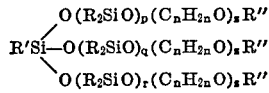

where $p+q+r=y$ of Formula IV and has a minimum value of 3, the other subscripts being the same as in Formula IV. In this instance, all three of the oxyalkylene chains are joined to the end of polysiloxane chains of the type —(R$_2$SiO)—, wherein R is preferably alkyl, such as methyl. A representative composition of the type of compounds or products and mixtures of the same characterized by Formula V above is a composition wherein R is methyl, wherein R' is methyl or ethyl, the average values of $p$, $q$ and $r$ are about 6 and wherein the (C$_n$H$_{2n}$O)$_z$ unit represents a mixed polyoxyethyleneoxypropylene block containing an average of about seventeen oxyethylene units and an average of about thirteen oxypropylene units and R'' represents a butyl group. Other compositions of the class represented by Formula V above are mixtures of compositions wherein R' is methyl or ethyl, wherein R is methyl, wherein the average values of $p$, $q$ and $r$ are about three, wherein the (C$_n$H$_{2n}$O)$_z$ unit represents a polyoxyethylene block containing an average of about sixteen oxyethylene units, and wherein R'' represents a methyl group. Still another composition of the class described is a mixture product wherein the average values of $p$, $q$ and $r$ are about three and the (C$_n$H$_{2n}$O)$_z$ unit is a polyoxypropylene block containing an average of from about twelve to thirteen oxypropylene units and R'' represents a butyl group.

However, another type of branched-chain block copolymer exists when one of the oxyalkylene chains is attached through an oxygen atom to the trifunctional silicon atom bonded only to a single hydrocarbyl radical (R'). This formula may be given as follows:

VI
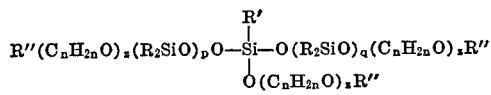

where $p+q=y$ of Formula IV and has a minimum value of 3.

Another type of block copolymer is represented when there are present therein two trifunctional silicon atoms each bonded to a single divalent hydrocarbon radical, and correspondingly present therein six polyoxyalkylene chains. Such block copolymers may be represented by the formula:

VII 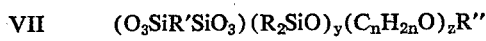

wherein R, R'', $y$, $n$, and $z$ are as designated in Formula IV, and R' is a divalent hydrocarbon radical. Expressed in structural form these block copolymers may be represented by the following formula:

VIII

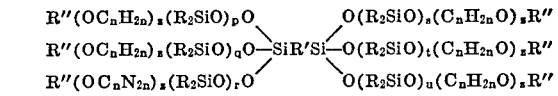

where $p+q+r+s+t+u$ is equal to $y$ of Formula IV and in this instance has a minimum value of about 6.

The above-described siloxane-oxyalkylene block copolymers of Formulas V through VIII can be prepared in accordance with the procedures described and claimed in the application of D. L. Bailey and F. M. O'Connor, Ser. No. 417,935, filed Mar. 22, 1954, now U.S. Pat. No. 2,834,748.

Other siloxane-oxyalkylene block copolymers which deserve mention are those corresponding to the general formula:

IX 

where $y$ is an integer having a value of at least 2 and denotes the number of siloxane units, $n$ is an integer from 2 to 4 denoting the number of carbon atoms in the oxyalkylene group, $x$ is an integer having a value of at least 5 and denotes the length of the oxyalkylene chain, and $a$ and $b$ are integers whose sum is 2 or 3. R' and R'' are chain-terminating monovalent hydrocarbyl or hydrocarbyloxy radicals, and may terminate a siloxane chain either by a hydrocarbyloxy group or by completing a trihydrocarbylsilyl group and may terminate an oxyalkylene chain with a hydrocarbyloxy group. It will be understood further that the compositions of matter are mixtures of such block copolymers wherein $x$ and $y$ are of different values and that methods of determining the chain length of the polysiloxane chains and the polyoxyalkylene chains give values which represent average chain lengths.

With reference to Formula IX above, it will be noted that there is at least one oxyalkylene chain or block joined to at least one siloxane chain or block through a Si—O—C bond, and different types of block copolymers are formed depending on the values of $a$ and $b$.

In one type, there is one block of siloxane polymer ($a$ is 1) and two blocks of oxyalkylene polymer ($b$ is 2) and such type may be represented as follows:

X 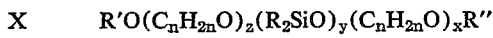

where the subscripts are as defined in Formula IX above and R' and R'' are monovalent hydrocarbyl radicals.

In another type of block copolymer, there is one block of oxyalkylene polymer ($b$ is 1) and two blocks of siloxane polymer ($a$ is 2) and this type may be represented as follows:

XI 

where R' and R'' are monovalent hydrocarbyl or hydrocarbyloxy radicals, and the other subscripts are as defined in Formula IX.

In a third type of block copolymer, there is one block of a siloxane polymer and one block of an oxyalkylene polymer ($a$ and $b$ both equal 1), and this type may be represented as follows:

XII 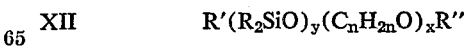

where R' and R'' are monovalent hydrocarbyl or hydrocarbyloxy radicals.

The types of siloxane-oxyalkylene block copolymers represented by general Formulas IX through XII can be prepared in accordance with the procedures described and claimed in the copending application of D. L. Bailey and F. M. O'Connor, Ser. No. 435,938, filed June 10, 1954, now U.S. Pat. No. 2,917,480.

Still other polysiloxane-oxyalkylene surfactant systems useful as components of the curing compositions of this invention are those containing the aforesaid copolymers characterized by the following general formula:

XIII  R'O[(C_nH_{2n}O)_y]_c[(R_2SiO)_x(C_nH_{2n}O)_y]_d[(R_2SiO)_x]_eR' in which R' is hydrogen when attached to oxyalkylene polymers and a monovalent alkyl group when attached to siloxane polymers; R is a monovalent hydrocarbyl group and which can be the same or different for all R's in the molecule; $x$ is an integer of 2 or more; $y$ is an integer of 5 or more; $n$ is an integer from 2 to 4; and $a$ and $b$ are integers each of which is equal to at least one; $c$ and $e$ are integers having a value of zero or one; and $d$ is an integer of a value of one or of a greater value. The symbol, R', as used in this formula, represents a monovalent chain-terminating group which is hydrogen when terminating an oxyalkylene block end of the copolymeric chain. When terminating a silicone block end of the copolymeric chain, R' is an alkyl group. Whether or not the terminal groups are hydrogen or alkyl apparently has little if any influence on the important properties and utility as emulsifiers.

Included within the scope of Formula XIII are block copolymers wherein the integers $c$ and $e$ are both equal to zero and the integer $d$ is a value of one or more, the general formula of this type being:

XIV  R"O[(R_2SiO)_x(C_nH_{2n}O)_y]_dH wherein R" designates a monovalent alkyl group; R represents a monovalent hydrocarbyl group; and $x$, $y$, $n$, and $d$ represent integers as defined in Formula XIII.

Referring to Formula XIII, a second type of organo-silicone block copolymer is one in which $c$ equals one, $e$ equals zero and $d$ has a value of one or more, the general formula of this type being:

XV  HO(C_nH_{2n}O)_y[(R_2SiO)_x(C_nH_{2n}O)_y]_dH wherein R designates a hydrocarbyl group; and $x$, $y$, $n$ and $d$ are integers having the same definitions as for those of like designations in Formula XIII.

A third type of organo-silicone block copolymer is characterized by siloxane blocks at each end of the copolymeric chain and can be represented by Formula XIII when $c$ is equal to zero, $e$ has a value of one and $d$ represents an integer of at least one. This type of block copolymer is more particularly illustrated by the general formula:

XVI  R"O[(R_2SiO)_x(C_nH_{2n}O)_y]_d(R_2SiO)_xR"

wherein R designates a hydrocarbyl group; R" is an alkyl group; and $x$, $y$, $n$, and $d$ are integers having the same values as provided for in Formula XIII.

The polysiloxane-oxyalkylene block copolymer emulsifiers characterized by Formulae XIII through XVI can be prepared according to the procedures described and claimed in the copending application of D. L. Bailey and F. M. O'Connor, Ser. No. 661,009, filed May 23, 1957, now abandoned.

Another group of polysiloxane-oxyalkylene block copolymer surfactant systems which deserve mention are mixtures of block copolymers wherein each copolymer contains at least one siloxane polymer and at least one oxyalkylene polymer in combination, the siloxane polymer being comprised of at least one trifunctional silicon atom bonded to three oxygen atoms and a hydrocarbyl group and joined to at least one oxyalkylene polymer through a carbon-oxy-silicon bond and the oxyalkylene polymer being composed of at least 5 oxyalkylene units joined to each other by oxycarbon bonds and joined at least at one end to a siloxane polymer through a carbon-oxy-silicon bond.

These compounds can be prepared according to the procedures described and claimed in the copending application of D. L. Bailey and F. M. O'Connor, Ser. No. 660,997, filed May 23, 1957, now abandoned.

In addition, it is sometimes desirable to add to the siloxane-oxyalkylene surfactant systems described above, small quantities of hydrocarbyl silicone oils, such as dimethyl silicone oils. It appears that certain beneficial effects can be obtained, such as a more complete regulation of the number and size of the open cells in the foam. Normally, the dimethyl silicone oils employed are those having viscosities from 10 to 1000 centistokes.

The amount of the polysiloxane-polyoxyalkylene copolymer employed is not necessarily a critical feature of the process. The concentration normally preferred is a minor amount of surfactant composition ranging from 0.1 to 1.0 percent by weight based on the weight of the ingredients of the recipe, i.e., polyether, polyisocyanate or polyisothiocyanate, foaming or blowing agent such as water and catalyst. A convenient amount to employ which gives desirable results is about 0.5 percent. The surfactant can be added to the water-amine catalyst mixture or to the other reactants as desired.

In evaluating the physical properties of the foams produced in the various examples, density was determined by weighing a cylindrical sample two inches in diameter and one inch in thickness and thereupon calculating the density in pounds per cubic foot. To evaluate compression, a cylindrical sample two inches in diameter and one inch thick was placed on the anvil (six inch diameter) of an Instron equipped for compression tests, the cross head moved a plate of three inches in diameter toward the anvil at a rate of two inches per minute, and the stress load on the anvil was plotted against the deflection of the sample. The stress load is given in p.s.i. for 25 and 50% deflections. The compression set is measured in accordance with the procedure outlined in ASTM D395–53T, Method B. Plate flow is determined by taking two grams of resin and forming a pellet 6 mm. thick and 12 mm. in diameter. This is placed on a 6" x 6" glass plate and placed in an oven at 125° C. After 3 minutes, the plate is tilted at an angle of 65° from the horizontal and after 20 minutes more is moved from the oven and the length of the flow path is measured.

Tensile strength and elongation were determined in accordance with the procedure set forth in Rubber Age, Volume 79, Number 5, pages 803–810 (1956). Percentage closed cells or closed cell content was determined by the method of W. J. Remington and R. Pariser presented before the Division of Rubber Chemistry, ACS, in New York, Sept. 12, 1957 and published in Rubber World Volume 138, Number 2, pages 261–264 (1958). Strength retention in ° C. at 70 percent was determined by placing specimens of foams ⅛" x ½" x 3" in the jaws of Instron machine which extend into a temperature cabinet. After the specimen is mounted in the jaws the cabinet is sealed and a constant temperature is maintained therein for three minutes prior to application of load. Load is applied in tension and the specimen is extended by an amount equivalent to one percent of the original jaw separation. The load is immediately relaxed and, since the limit of elasticity has not ben exceeded, the specimen returns essentially to its original length. The rate of head movement is 0.2 in./min. Load and head movement are recorded automatically on a continuous strip chart. This procedure is followed at various temperature increments, starting at about room temperature and continuing up until the load necessary to extend the specimen one percent has fallen below 70 percent of that required at about room temperature. The loads at one percent extension are then plotted against the temperatures and connected by a curve. The temperature at which the load is 70 percent of the load at about room temperature is then recorded as the strength retention temperature in ° C. (70%).

The process of the invention admits of numerous variations and innovations, all of which are within the scope of the invention and should not be limited except as defined in the appended claims. For example, one embodiment of this invention is directed to water-foamable compositions comprising a polyalkylene ether glycol, a polyisocyanate or polyisothiocyanate, a catalyst composition comprising an organotin compound and a tertiary amine of the class described and a polyoxyalkylene oxide-polysiloxane emulsifier.

It is also within the scope of the invention to add fillers such as clays or diatomaceous earths in quantities up to 20 percent by weight based on the weight of total ingredients. Dyes may also be added to the basic foam recipe and, in some instances, are desirable since polyurethane foams normally exhibit a slight tendency to yellow on ageing.

The following examples will serve to illustrate the novel embodiments of the invention and the process for their preparation. In the following examples the surfactant compositions have been described in terms of their compositions and are represented by Formula V, above.

EXAMPLE 1

A recipe was prepared comprising:

(a) 112.5 grams of polypropylene glycol having a molecular weight of 1900, a hydroxyl number of 58.5, a carboxyl number of 0.15 and containing 0.13 percent water and 37.5 grams of a polyether polyol block polymer prepared from propylene oxide and ethylene oxide using ethylene diamine as a starter and containing 10 percent polyoxyethylene characterized by the following physical properties:

| | |
|---|---|
| Specific gravity at 20/20° C. | 1.0260 |
| Water, percent | .06 |
| Volatility, percent | .19 |
| Ash percent | .25 |
| Average Molecular Weight | 3629 |
| Hydroxyl number | 61.8 |
| Acid number | Nil |
| Gel Test, seconds | 6 |
| pH 10:1 aqueous isopropanol | 9.10 |
| pH 10:6 aqueous isopropanol | 9.55 |
| Color, Gardner | 3.5 |
| Unsaturation, meq./gm. | .015 |

(b) 50.5 grams of an 80:20 mixture of 2,4- and 2,6-isomers of toylene diisocyanate.
(c) 3.75 grams of water.
(d) 0.6 grams of dibutyltin dilaurate.
(e) 0.9 grams of a siloxane-oxyalkylene block copolymer of triethoxy end-blocked branched chain dimethypolysiloxane having a molecular weight of 1524 and butoxy end-blocked polyoxyethylene-oxypropylene glycol having a molecular weight of 1500 (as represented by Formula V wherein R' is ethyl, wherein R is methyl, wherein $p$, $q$ and $r$ are about six, the $(C_nH_{2n}O)_z$ unit represents a mixed polyoxyethyleneoxypropylene block containing about seventeen oxyethylene units and about thirteen oxypropylene units and R" represents a butyl group).

The above-described mixture was thoroughly mixed and transferred to an open mold as soon as it started foaming. The foamed mixture cured in a matter of minutes and was characterized by the following physical properties:

| | |
|---|---|
| Density, lbs./cu. ft. | 2.57 |
| Tensile strength, p.s.i. | 13.0 |
| Compression load at 25% deflection, p.s.i. | 0.354 |
| Compression set, percent | 11.2 |

The above example illustrates the use of a tertiary amine catalyst which contains active hydrogen atoms reactive with isocyanate groups.

EXAMPLE 2

A recipe was prepared comprising:

(a) 100 grams of polypropylene glycol having a molecular weight of 1900, a hydroxyl number of 58.5, a carboxyl number of 0.15 and containing 0.13 percent water and 50 grams of a polyether polyol block polymer prepared from propylene oxide and ethylene oxide using ethylenediamine as a starter and containing 10 percent polyoxyethylene characterized by the following physical properties:

| | |
|---|---|
| Specific gravity at 20/20° C. | 1.0260 |
| Water, percent | .06 |
| Volatility, percent | .19 |
| Ash percent | .25 |
| Average Molecular Weight | 3629 |
| Hydroxyl number | 61.8 |
| Acid number | Nil |
| Gel Test, seconds | 6 |
| pH 10:1 aqueous isopropanol | 9.10 |
| pH 10:6 aqueous isopropanol | 9.55 |
| Color, Gardner | 3.5 |
| Unsaturation, meq./gm. | .015 |

(b) 50.5 grams of an 80:20 mixture of 2,4- and 2,6-isomers of tolylene diisocyanate.
(c) 3.75 grams of water.
(d) 0.7 grams of dibutyltin dilaurate.
(e) 1.0 grams of a siloxane-oxyalkylene block copolymer as described in Example 1.

The above-described mixture was thoroughly mixed and transferred to an open mold as soon as it started foaming. The foamed mixture cured in a matter of minutes and was characterized by the following physical properties:

| | |
|---|---|
| Density, lbs./cut. ft. | 2.74 |
| Tensile Strength, p.s.i. | 12.0 |
| Compression set, percent | 12.0 |
| Compression load at 25% deflection, p.s.i. | 0.465 |
| Compression load at 50% deflection, p.s.i. | 0.615 |

The above example also illustrates the use of a tertiary amine catalyst which contains active hydrogen atoms reactive with isocyanate groups.

EXAMPLE 3

A recipe was prepared comprising:

(a) 150 grams of a polyether prepared by reacting propylene oxide and triisopropanolamine, and having a molecular weight of 2850.
(b) 50 grams of 80:20 mixture of 2,4- and 2,6-diisocyanate.
(c) 3.75 grams of water.
(d) 0.7 grams of dibutyltin dilaurate.
(e) 0.7 grams of a siloxane-oxyalkylene block copolymer as described in Example 1.

The above described mixture was thoroughly mixed and transferred to an open mold as soon as it started foaming. The foamed mixture cured in a matter of minutes and was characterized by the following physical properties:

| | |
|---|---|
| Density, lbs./ft. | 3.06 |
| Tensile strength, p.s.i. | 15 |
| Compression set, percent | 9.9 |
| Compression load at 25% deflection, p.s.i. | 0.765 |
| Compression load at 50% deflection, p.s.i. | 1.02 |

EXAMPLE 4

A recipe was prepared comprising:

(a) 75 grams of polypropylene glycol having a molecular weight of 2010, and 75 grams of a polyether prepared by reacting propylene oxide with glycerol and having a molecular weight of 2990.
(b) 55.2 grams of a 80:20 mixture of 2,4- and 2,6-tolylene diisocyanate.
(c) 4.0 grams of water.
(d) 1.0 grams of dibutyltin dilaurate.
(e) 1.25 grams of a siloxane-oxyalkylene block copolymer as described in Example 1.
(f) 0.25 grams of N-methylmorpholine.

The above described mixture was thoroughly mixed and transferred to an open mold as soon as it started foaming. The foamed mixture cured in a matter of minutes and was characterized by the following physical properties:

Density, lbs./cu. ft. _____ 2.38
Tensile strength, p.s.i. _____ 21.4
Compression at 25% deflection, p.s.i. _____ 0.45
Compression at 50% deflection, p.s.i. _____ 0.57
Compression set, percent _____ 4.7

EXAMPLE 5

A recipe was prepared comprising:

(a) 75 grams of polypropylene glycol having a molecular weight of 2010, and 75 grams of a polyether prepared by reacting propylene oxide with glycerol and having a molecular weight of 2990.
(b) 55.2 grams of a 80:20 mixture of 2,4- and 2,6-tolylene diisocyanate.
(c) 4.0 grams of water.
(d) 1.0 grams of dibutyltin dilaurate.
(e) 1.25 grams of a siloxane-oxyalkylene block copolymer as described in Example 1.
(f) 0.25 grams of N,N,N',N'-tetramethyl-1,3-butanediamine.

The above described mixture was thoroughly mixed and transferred to an open mold as soon as it started foaming. The foamed mixture cured in a matter of minutes and was characterized by the following physical properties:

Density, lbs./cu. ft. _____ 2.15
Tensile strength, p.s.i. _____ 15.5
Compression at 25% deflection, p.s.i. _____ 0.33
Compression at 50% deflection, p.s.i. _____ 0.44
Compression set, percent _____ 7.8

EXAMPLE 6

A recipe was prepared comprising:

(a) 75 grams of polypropylene glycol having a molecular weight of 2010, and 75 grams of a polyether prepared by reacting propylene oxide with glycerol and having a molecular weight of 2990.
(b) 55.2 grams of a 80:20 mixture of 2,4- and 2,6-tolylene diisocyanate.
(c) grams of water.
(d) 0.6 grams of dibutyltin dilaurate.
(e) 1.25 grams of a siloxane-oxyalkylene block copolymer as described in Example 1.
(f) 0.25 grams of triethylamine.

The above described mixture was thoroughly mixed and transferred to an open mold as soon as it started foaming. The foamed mixture cured in a matter of minutes and was characterized by the following physical properties:

Density, lbs./cu. ft. _____ 2.29
Tensile strength, p.s.i. _____ 19.2
Compression at 25% deflection, p.s.i. _____ 0.41
Compression at 50% deflection, p.s.i. _____ 0.54
Compression set, percent _____ 10.1

EXAMPLE 7

A recipe was prepared comprising:

(a) 75 grams of polypropylene glycol having a molecular weight of 2010, and 75 grams of a polyether prepared by reacting propylene oxide with glycerol and having a molecular weight of 2990.
(b) 55.2 grams of a 80:20 mixture of 2,4- and 2,6-tolylene diisocyanate.
(c) 4.0 grams of water.
(d) 0.6 grams of dibutyltin dilaurate.
(e) 1.7 grams of a siloxane-oxyalkylene block copolymer as described in Example 1.
(f) 1.0 grams of N,N-dimethylbenzylamine.

The above described mixture was thoroughly mixed and transferred to an open mold as soon as it started foaming. The foamed mixture cured in a matter of minutes and was characterized by the following physical properties:

Density, lbs./cu. ft. _____ 2.17
Tensile strength, p.s.i. _____ 20.6
Compression at 25% deflection, p.s.i. _____ 0.40
Compression at 50% deflection, p.s.i. _____ 0.54
Compression set, percent _____ 9.6

EXAMPLE 8

A foam was prepared os a continuous foaming machine by a recipe comprising the following ingredients:

(a) 72.30 parts of polypropylene glycol having a molecular weight of 2050.
(b) 25.02 parts of an 80:20 mixture of 2,4- and 2,6-tolylene diisocyanate.
(c) 1.7 parts of water.
(d) 0.4 parts of a siloxane-oxyalkylene block copolymer as described in Example 1.
(e) 0.35 parts of dibutyltin dilaurate.
(f) 0.20 parts of 1,4-diazabicyclo[2.2.2]octane.

After curing the resulting foam had the following physical properties:

Density, lbs./cu. ft. _____ 2.76
Tensile strength, p.s.i. _____ 18.3
Compression set, percent _____ 4.6
Compression load at 25% deflection, p.s.i. _____ 0.64
Compression load at 50% deflection, p.s.i. _____ 0.72

EXAMPLE 9

A recipe was prepared comprising:

(a) 75 grams of a polypropylene glycol having a molecular weight of 2010, and 75 grams of a reaction product of glycerol and propylene oxide having a molecular weight of 2990.
(b) 55.3 grams of an 80:20 mixture of 2,4- and 2,6-tolylene diisocyanate.
(c) 4.0 grams of water.
(d) 1.25 grams of a siloxane-oxyalkylene block copolymer as described in Example 1.
(e) 0.1 grams of 1,4-diazabicyclo[2.2.2]octane.
(f) 1.0 grams of tetrabutyltin.

The resulting foam had a density of 2.73 lbs./cu. ft.

EXAMPLE 10

A recipe was prepared comprising:

(a) 75 grams of a polypropylene glycol having a molecular weight of 2010, and 75 grams of a reaction product of glycerol and propylene oxide having a molecular weight of 2990.
(b) 55.3 grams of an 80:20 mixture of 2,4- and 2,6-tolylene diisocyanate.
(c) 4.0 grams of water.
(d) 1.25 grams of a siloxane-oxyalkylene block copolymer as described in Example 1.
(e) 0.1 grams of 1,4-diazabicyclo[2.2.2]octane.
(f) 1.0 gram of dimethyltin dichloride.

The resulting foam had a density of 2.10 lbs./cu. ft.

EXAMPLE 11

A recipe was prepared comprising:

(a) 75 grams of a polypropylene glycol having a molecular weight of 2010 and 75 grams of a reaction product of glycerol and propylene oxide having a molecular weight of 2990.
(b) 55.3 grams of an 80:20 mixture of 2,4- and 2,6-tolylene diisocyanate.
(c) 4.0 grams of water.

19

(d) 1.25 grams of a siloxane-oxyalkylene block copolymer as described in Example 1.
(e) 0.1 gram of 1,4-diazabicyclo[2.2.2]octane.
(f) 1.0 gram of tributyltin acetate.

The resulting foam had a density of 2.71 lbs./cu. ft.

EXAMPLE 12

90 grams of a propylene oxide addition product of sorbitol[1] (Hydroxyl No. 367.5) were mixed with 86.2 grams of a semiprepolymer prepared therefrom (29.9% total free NCO), 0.45 gram of a silicon oil surfactant (siloxane-oxyalkylene copolymer as described above in Example 1), 37 grams trichloromonofluoromethane and 0.65 gram of a catalyst composition consisting of 0.40 gram triethylenediamine and 0.25 gram dibutyltin dilaurate. A foamed polyurethane product was obtained having a density of 1.8 p.c.f. and a compressive strength of 16 p.s.i. at 85° C. parallel to the foam rise and 9 p.s.i. at 85° C. perpendicular to the foam rise.

EXAMPLE 13

A recipe was prepared comprising:

(a) 100 grams of a polyester-ether, prepared by reacting 15.5 grams of ethylene glycol, 150 grams of epsilon-caprolactone, 350 grams of ethylene oxide and 0.25 ml. of boron trifluoride ethyl etherate, having a molecular weight of 2200.
(b) 50 grams of a 65:35 mixture of 2,4 and 2,6 tolylene diisocyanate containing 0.5 percent of "Ethocel."
(c) 3.1 grams of water.
(d) 0.75 grams of dioctyltin oxide.
(e) 0.20 grams of N-methylmorpholine.

As soon as the mixture began to foam, it was transferred to an open mold. The resulting foam volume was excellent, foam rise time and cure time were surprisingly good. The resulting foam had the following physical properties:

Density, lbs./cu. ft. _____ 2.04
Tensile strength, p.s.i. _____ 16
Compression load at 50% deflection, p.s.i. _____ 0.80

EXAMPLE 14

A recipe was prepared comprising:

(a) 100 grams of a polyester ether, prepared by reacting 15.5 grams of ethylene glycol, 200 grams of epsilon-caprolactone, 306 grams of ethylene oxide, 0.25 ml. of boron trifluoride ethyl etherate, having a molecular weight of 2180.
(b) 40 grams of a 65:35 mixture of 2,4 and 2,6 tolylene diisocyanate containing 0.5 percent "Ethocel."
(c) 3.1 grams of water.
(d) 0.75 grams of dioctyltin oxide.
(e) 0.20 grams of N-methylmorpholine.

As soon as the mixture began to foam, it was transferred to an open mold. The resulting foam volume was very good, and foam rise time and cure time were surprisingly good. The resulting foam has the following physical properties:

Density, lbs./cu. ft. _____ 1.74
Tensile strength, p.s.i. _____ 8
Compression load at 50% deflection, p.s.i. _____ 0.54

EXAMPLE 15

A recipe was prepared comprising:

(a) 75 grams of polypropylene glycol having a molecular weight of 1900, and 75 grams of a reaction product

[1] A charge of 4360 grams of 70% by weight aqueous sorbitol and 127 grams of 40% by weight aqueous potassium hydroxide was initially vacuum stripped at 120° C. The stripped material was then reacted with 13,300 grams of propylene oxide at an average temperature of 115° C. at 40 p.s.i.g. over a 10 hour period.

20 of propylene oxide and 1,2,6-hexanetriol, having a molecular weight of 2620.
(b) 54 grams of 80:20 mixture of 2,4 and 2,6 tolylene diisocyanate.
(c) 3.75 grams of water.
(d) 0.9 grams of a siloxane-oxyalkylene emulsifier as described in Example 1.
(e) 0.5 grams of triethylamine.
(f) 0.8 grams of dibutyltin dilaurate.

The above mixture was foamed by the one-shot method. The resulting foaming mixture rose much faster than foams usually prepared with dibutyltin dilaurate as only catalyst. The cure was much improved over that observed with tin catalyst as the single catalyst system.

The above experiment was repeated except that 0.9 gram of dibutyltin dilaurate and 0.3 gram of triethylamine were employed. The resulting foam exhibited much improved foam rise time and cure.

EXAMPLE 16

A recipe was prepared comprising:

(a) 213 grams of polypropylene glycol having a molecular weight of 2010 and 213 grams of a reaction product of glycerol and propylene oxide and having a molecular weight of 2990.
(b) 155 grams of an 80:20 mixture of 2,4 and 2,6 tolylene diisocyanate.
(c) 3.6 grams of a siloxane-oxyalkylene emulsifier as described in Example 1.
(d) 3.0 grams of dibutyltin dilaurate.

A variety of tertiary amines at different concentrations were added to the above recipe, and their effect on the time of foam rise was observed.

| | Amount gms. | Foam rise time, sec. |
|---|---|---|
| Triethylamine | 0.3 | 133 |
| Do | 0.6 | 120 |
| Do | 1.2 | 100 |
| N,N-dimethylbenzylamine | .90 | 127 |
| Do | 1.50 | 118 |
| Do | 2.10 | 110 |
| N,N,N',N'-tetramethyl-1,3-butane diamine | 0.15 | 134 |
| Do | 0.30 | 116 |
| Do | 0.60 | 92 |
| None | | 202 |

The above foam rise times clearly illustrate the efficiency of the synergistic tin-amine combination catalyst system. In the absence of tertiary amine catalyst a considerably longer rise time is observed than with the use of the combination system.

EXAMPLE 17

A recipe was prepared comprising:

(a) 75 grams of a polypropylene glycol having a molecular weight of 2010, and 75 grams of a reaction product of glycerol and propylene oxide having a molecular weight of 2990.
(b) 55.3 grams of an 80:20 mixture of 2,4 and 2,6 tolylene diisocyanate.
(c) 4.0 grams of water.
(d) 1.25 grams of siloxane-oxyalkylene block copolymer emulsifier as described in Example 1.
(e) 0.1 gram of 1,4-diaza-bicyclo-[2,2,2]octane.
(f) 1.0 gram of dibutyltin dibenzenesulfonamide.

The resulting foam had a density of 2.70 lbs./cu. ft.

EXAMPLE 18

A recipe was prepared comprising 0.7 gram of triethylenediamine and 1.3 grams of a copolymer of triethoxy end-blocked branched chain dimethylpolysiloxane having a molecular weight of 858 and a methoxy end-blocked polyoxyethylene glycol having a molecular weight of 750 (as represented by Formula V wherein $p$, $q$ and $r$ each have an average value of three (3), the $(C_nH_{2n}O)_2$ unit is a polyoxyethylene, block containing an average of sixteen (16) oxyethylene units, R' represents ethyl, R represents methyl, and R" represents a methyl group).

The above-described recipe was added to a mixture of (1) 35.0 grams of a polyether prepared by the reaction of propylene oxide and a mixture of 1,1,3-tris(hydroxyphenyl)propanes having a phenolic hydroxyl number of about 527 until a hydroxyl number of 262 was obtained and (2) 15.0 grams of a polyether prepared by the reaction of propylene oxide and glycerol and having a hydroxyl number of 650.5, said mixture having a hydroxyl number of 378.5 and a negative carboxyl number thoroughly mixed with 43.3 grams of an 80:20 mixture of 2,4- and 2,6-isomers of tolylene diisocyanate containing 0.1 percent dissolved ethyl cellulose and 1.4 grams of water.

The mixture was stirred and transferred to an open mold as soon as the reactants started to get warm. The foam was post cured in an oven at 100° C. for 10 minutes.

The foam was characterized by the following physical properties.

Density, lbs./ft.³ _____ 2.0
Strength retention temperature, ° C. at 70% _____ 86
Compression load, 10% _____ 16

EXAMPLE 19

A conventional "prepolymer" was prepared by reacting polypropylene glycol having a molecular weight of about 1900, a small amount of trimethylolpropane and a stoichiometric quantity of an 80:20 mixture of 2,4- and 2,6-isomers of tolylene diisocyanate at a temperature of about 100° C. to 120° C. for about two hours. The product of the reaction (prepolymer) was recovered and combined with additional isocyanates to provide an isocyanate (—NC=O) content of 9.5 weight percent based on the weight of the composition.

To the aforementioned prepolymer-isocyanate mixture was added 1.0 part of N-methylmorpholine, 0.2 part of triethylamine, 0.5 part of a dimethylpolysiloxane oil having a viscosity of 50 centistokes and 2.3 parts of water and allowed to foam. After foaming was complete, the foamed product was subjected to a post cure of 250° F. for several hours. The cured foamed product was characterized by the following physical properties:

Density, lbs./ft.³ _____ 2.62
Tensile strength, p.s.i. _____ 11.0
Compression load, p.s.i.
 25% deflection _____ 0.21
 50% deflection _____ 0.32
Compression set, percent _____ 10.7

EXAMPLE 20

A recipe was prepared comprising:

(a) 100 grams of a triol adduct of propylene oxide started with 1,2,6-hexanetriol and having a molecular weight of about 1500, a hydroxyl number of 113 and a carboxyl number of 0.19.
(b) 42 grams of 65:35 mixture of 2,4- and 2,6-isomers of tolylene diisocyanate.
(c) 2.5 grams of water.
(d) 1.5 grams of N-methylmorpholine.
(e) 0.5 gram of a siloxane-oxyalkylene block copolymer as described in Example 1.

The above ingredients were mixed directly and foaming took place. The resulting foam did not collapse and was allowed to cure over-night. The foamed product possessed a density of about 3.0 lbs./ft.³.

EXAMPLE 21

A recipe was prepared comprising:

(a) 150 grams of a triol adduct of propylene oxide started with glycerol and having a hydroxyl number of 56.0.
(b) 54.0 grams of an 80:20 mixture of 2,4- and 2,6-isomers of tolylene diisocyanate.
(c) 3.75 grams of water.
(d) 0.7 gram of N-methylmorpholine and 0.3 gram of triethylenediamine.
(e) 0.5 gram of a siloxane-oxyalkylene block copolymer as described in Example 1.

The above ingredients were mixed directly and foaming took place.

The foam was characterized by the following physical properties:

Tensile strength, lbs./ft.² _____ 12.5
Elongation, percent _____ 120
Density, lbs./ft.³ _____ 2.8
Compression load at 25% deflection, lbs./in. ____ 0.42
Compression set, percent _____ 7.2

EXAMPLE 22

A recipe was prepared comprising:

(a) 150 grams of a triol adduct of propylene oxide started with glycerol and having a hydroxyl number of 56.0.
(b) 54 grams of a 80:20 mixture of 2,4- and 2,6-isomers of tolylene diisocyanate.
(c) 3.75 grams of water.
(d) 0.5 gram of triethylenediamine.
(e) 1.25 grams of a siloxane-oxyalkylene block copolymer as described in Example 1.

The above ingredients were mixed directly and foaming took place.

The foam was characterized by the following physical properties:

Tensile strength, lbs./ft.² _____ 11.0
Elongation, percent _____ 110.0
Density, lbs./ft.³ _____ 2.74
Compression load at 25% deflection, lbs./in.² ____ 0.47
Compression set _____ 8.9

EXAMPLE 23

A recipe was prepared comprising:

(a) a mixture of (1) 35.0 grams of a polyether prepared by the reaction of propylene oxide and a mixture of 1,1,3-tris(hydroxyphenyl) propanes having a phenolic hydroxyl number of 527 until a hydroxyl number of 262 was obtained and (2) 15.0 grams of a polyether prepared by the reaction of propylene oxide and glycerol and having a hydroxyl number of 650.5, said mixture having a hydroxyl number of 378.5 and a negative carboxyl number.
(b) 43.3 grams of an 80:20 mixture of 2,4- and 2,6-isomers of tolylene diisocyanate containing 0.1 percent of dissolved ethyl cellulose.
(c) 1.4 grams of water.
(d) 0.7 gram of triethylenediamine.
(e) 1.3 grams of a siloxane-oxyalkylene block copolymer as described in Example 18.

The mixture was stirred and transferred to an open mold as soon as the reactants started to get warm. The foam was post cured in an oven at 100° C. for 10 minutes. The foam was characterized by the following physical properties:

Density, lbs./ft.³ _____ 2.0
Strength retention, temperature ° C. at 70% _____ 86
Compression load, 10% _____ 16

EXAMPLE 24

A recipe was prepared comprising:

(a) a mixture of (1) 70 grams of a polyether prepared by the reaction of propylene oxide and a mixture of 1,1,3-tris(hydroxyphenyl) propanes having a phenolic hydroxyl number of 527 until a hydroxyl number of 562 was obtained and (2) 30.0 grams of a polyether prepared by the reaction of propylene oxide and glycerol and having a hydroxyl number of 650.5, said mixture having a hydroxyl number of 378.5 and a negative carboxyl number.
(b) 71.7 grams of an 80.20 mixture of 2,4- and 2,6- isomers of tolylene diisocyanate containing 0.1 percent of dissolved ethyl cellulose.
(c) 1.3 grams of water.
(d) 0.7 gram of triethylenediamine.
(e) 1.3 grams of a siloxane-oxyalkylene block copolymer as described in Example 1.

The mixture was stirred and transferred to an open mold as soon as it started to get warm. The foam was post cured in an oven at 100° C. for ten minutes. The foam was characterized by the following physical properties:

Density, lbs./ft.$^3$ _____ 3.9
70% Strength retention temperature, ° C. _____ 94
10% compression load, p.s.i. _____ 80
Percent closed cells _____ 76

EXAMPLE 25

A recipe was prepared comprising:

(a) a mixture of (1) 70 grams of a polyether prepared by the reaction of propylene oxide and a mixture of 1,1,3-tris(hydroxyphenyl)propanes having a phenolic hydroxyl number of 527 until a hydroxyl number of 262 was obtained and (2) 30.0 grams of a polyether prepared by the reaction of propylene oxide and glycerol and having a hydroxyl number of 650.5, said mixture having a hydroxyl number of 378.5 and a negative carboxyl number.
(b) 71.7 grams of an 80:20 mixture of 2,4- and 2,6- isomers of tolylene diisocyanate containing 0.1 percent of dissolved ethyl cellulose.
(c) 1.3 grams of water.
(d) 0.7 gram of N,N,N',N'-tetramethylpropanediamine.
(e) 1.3 grams of a siloxane-oxyalkylene block copolymer as described in Example 1.

The mixture was stirred and transferred to an open mold as soon as it started to get warm. The foam had a density of about 4.0 lbs./ft.$^3$.

What is claimed is:

1. In the preparation of cellular polyurethanes by a process which comprises reacting a polyalkylene ether having at least two hydroxyl groups, water and an organic polyisocyanate, the improvement which comprises effecting the said reaction with a mixture containing triethylene diamine and a siloxane-oxyalkylene block copolymer having the formula

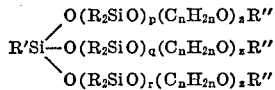

wherein R, R' and R" are alkyl radicals having 1 to 4 carbon atoms; $p$, $q$ and $r$ each have a value of from 3 to 6 and $(C_nH_{2n}O)_z$ is a mixed polyoxyethylene oxypropylene block containing 16 or 17 oxyethylene units and 12 or 13 oxypropylene units with $z$ equal to from about 28 to about 30.

2. The process of claim 1 wherein the polyether has from three to four hydroxyl groups.
3. The process of claim 1 wherein the polyisocyanate is an aromatic polyisocyanate.
4. The process of claim 1 wherein said mixture contains from about 0.2 part to about 1.4 parts triethylene diamine per 100 parts of said polyalkylene ether.
5. The process of claim 1 wherein said mixture contains from about 0.2 part to about 1.4 parts triethylene diamine per 100 parts of said polyalkylene ether and from about 0.33 part to about 2.6 parts of a siloxane-oxyalkylene block copolymer having the formula

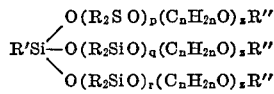

wherein R, R' and R" are alkyl radicals having 1 to 4 carbon atoms; $p$, $q$ and $r$ each have a value of from 3 to 6 and $(C_nH_{2n}O)_z$ is a mixed polyoxyethylene oxypropylene block containing 16 or 17 oxyethylene units and 12 or 13 oxypropylene units with $z$ equal to from about 28 to about 30.

6. A method for making a cellular polyurethane in which all of the reactants are mixed together substantially simultaneously, said method comprising mixing together a compound having a molecular weight of at least about 500 and selected from the group consisting of a polyalkylene ether glycol and a polyhydric compound prepared by condensation of an alkylene oxide having two or three carbon atoms and an alcohol having from three to four hydroxyl groups, an organic polyisocyanate, water, triethylene diamine and a siloxaneoxyalkylene block copolymer having the formula

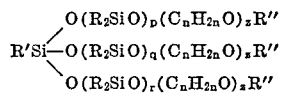

wherein R, R' and R" are alkyl radicals having 1 to 4 carbon atoms; $p$, $q$ and $r$ each have a value of from 3 to 6 and $(C_nH_{2n}O)_z$ is a mixed polyoxyethylene oxypropylene block containing 16 or 17 oxyethylene units and 12 or 13 oxypropylene units with $z$ equal to from about 28 to 30.

7. The process of claim 1 wherein said organic polyisocyanate is tolylene diisocyanate.
8. The process of claim 1 wherein the siloxaneoxyalkylene block copolymer has the formula

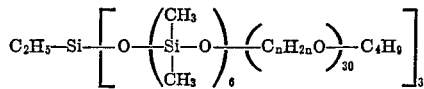

wherein $(C_nH_{2n}O)$ is a mixed polyoxyethylene and oxypropylene block containnig about 17 oxyethylene units and about 13 oxypropylene units.

9. The process of claim 1 wherein the polyalkylene ether glycol is polypropylene ether glycol and the siloxane-oxyalkylene block copolymer has the formula

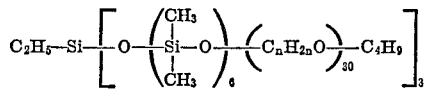

wherein $(C_nH_{2n}O)$ is a mixed polyoxyethylene and oxypropylene block containing about 17 oxyethylene units and about 13 oxypropylene units.

10. In the preparation of cellular polyurethanes by a process which comprises reacting a compound having a molecular weight of at least about 500 and selected from the group consisting of a polyalkylene ether glycol and a polyhydric compound prepared by condensation of an alkylene oxide having 2 or 3 carbon atoms and an alcohol having from 2 to 4 hydroxyl groups, water and an organic polyisocyanate, the improvement which comprises effecting the said reaction while the said reactants are in admixture with from about 0.2 part to about 1.4 parts triethylene diamine per 100 parts of said polyalkylene ether member and from about 0.33 part to about 2.6 parts of a siloxane-oxyalkylene block copolymer having the formula

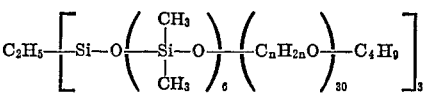

wherein $(C_nH_{2n}O)$ is mixed polyoxyethylene and polyoxypropylene block containing about 17 oxyethylene units and about 13 oxypropylene units.

11. A process for the preparation of a cellular polyurethane which comprises simultaneously mixing and reacting a polyalkylene ether having at least 2 hydroxy groups, an organic polyisocyanate, water, a tertiary amine catalyst and compound having the formula

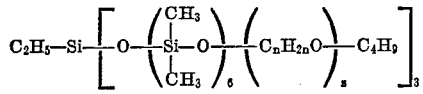

wherein $(C_nH_{2n}O)_z$ represents 17 oxyethylene units and 13 oxypropylene units, whereby a cellular polyurethane reaction product is produced.

12. In the preparation of a cellular polyurethane by a process which comprises simultaneously mixing and reacting a compound having the formula $R(NCX)_n$ wherein R is an organic radical, X is a member selected from the group consisting of oxygen and sulfur, and $n$ is an integer of from 2 to 3, with a polyalkylene ether having from 2 to 4 hydroxyl groups and a molecular weight of at least about 500 and water, the improvement which comprises including in the formulation a tertiary amine catalyst and a siloxane oxyalkylene block copolymer having the formula

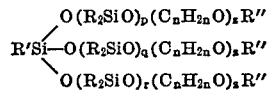

wherein R is a methyl group, R' is an ethyl group, R'' is a butyl group; $p$, $q$ and $r$ each has a value of 6; and $(C_nH_{2n}O)_z$ is a mixture of oxyethylene units and oxypropylene units containing about 17 oxyethylene units and about 13 oxypropylene units, and z is about 30.

References Cited

UNITED STATES PATENTS

| | | | |
|---|---|---|---|
| 3,397,158 | 8/1968 | Britain et al. | 260—2.5 |
| 3,471,465 | 10/1969 | Loew | 260—2.5 |
| 2,425,755 | 8/1947 | Roberts et al. | 260—615 |
| 2,834,748 | 5/1958 | Bailey et al. | 260—825 |
| Re. 24,514 | 8/1958 | Hoppe et al. | 260—2.5 |

DONALD E. CZAJA, Primary Examiner

E. C. RZUCIDLO, Assistant Examiner

U.S. Cl. X.R.

260—2.5 AB, 2.5 AC

UNITED STATES PATENT OFFICE
CERTIFICATE OF CORRECTION

Patent No. 3,817,882           Dated  June 18, 1974

Inventor(s) Fritz Hostettler et al

It is certified that error appears in the above-identified patent and that said Letters Patent are hereby corrected as shown below:

Column 12, that portion of the last line of the formula, $--(OC_nN_{2n})--$ should read $--(OC_nH_{2n})--$. Column 17, line 45, after (c) insert --4.0--. Column 24, line 3, that portion of the top line of the formula $--(R_2SO)--$ should read $--(R_2SiO)--$.

Signed and Sealed this eleventh Day of May 1976

[SEAL]

Attest:

RUTH C. MASON
Attesting Officer

C. MARSHALL DANN
Commissioner of Patents and Trademarks